US008733080B2

(12) United States Patent
Jones et al.

(10) Patent No.: US 8,733,080 B2
(45) Date of Patent: May 27, 2014

(54) THRUST REVERSER AND VAFN ARRANGEMENT

(75) Inventors: Tony Jones, Birmingham (GB); John Herbert Harvey, Wolverhampton (GB); Peter William Bacon, Wolverhampton (GB); Mark Hubberstey, Wolverhampton (GB); Brett John Wharton, Wednesbury (GB); Neil Charles Davies, Much Wenlock (GB); Stephen Michael Roberts, San Diego, CA (US); Steven Andrew Wylie, San Diego, CA (US)

(73) Assignee: Goodrich Actuation Systems Limited (GB)

( * ) Notice: Subject to any disclaimer, the term of this patent is extended or adjusted under 35 U.S.C. 154(b) by 1596 days.

(21) Appl. No.: 12/057,497

(22) Filed: Mar. 28, 2008

(65) Prior Publication Data
US 2009/0013664 A1 Jan. 15, 2009

(30) Foreign Application Priority Data
Mar. 30, 2007 (GB) .................................. 0706270.6

(51) Int. Cl.
*F02K 1/09* (2006.01)
*F02K 1/72* (2006.01)

(52) U.S. Cl.
USPC ..................... 60/226.2; 60/226.3; 244/110 B; 239/265.31; 239/265.33

(58) Field of Classification Search
USPC ..................... 60/226.2, 232, 770, 771, 226.3; 244/110 B; 239/265.31, 265.33
See application file for complete search history.

(56) References Cited

U.S. PATENT DOCUMENTS

| 3,360,308 | A | * | 12/1967 | Grabowski et al. | ............. 384/45 |
| 4,375,276 | A | * | 3/1983 | Konarski | ................. 239/265.29 |
| 4,519,561 | A | * | 5/1985 | Timms | ....................... 244/110 B |
| 5,806,302 | A | | 9/1998 | Cariola et al. | |
| 6,167,694 | B1 | * | 1/2001 | Davies | .......................... 60/226.2 |
| 2009/0288386 | A1 | * | 11/2009 | Marshall et al. | ................. 60/204 |

FOREIGN PATENT DOCUMENTS

EP 1052427 11/2000
FR 2866020 8/2005

OTHER PUBLICATIONS

European Search Report dated Jun. 22, 2010.

* cited by examiner

*Primary Examiner* — Andrew Nguyen
(74) *Attorney, Agent, or Firm* — Cantor Colburn LLP

(57) ABSTRACT

An actuator arrangement comprises an actuator having a rotatable drive input, a motor, and a drive transmission arrangement for transmitting rotary drive from the motor to the rotatable drive input of the actuator, wherein the transmission arrangement includes a telescopic drive coupling.

9 Claims, 2 Drawing Sheets

THRUST REVERSER AND VAFN ARRANGEMENT

Figure 1:
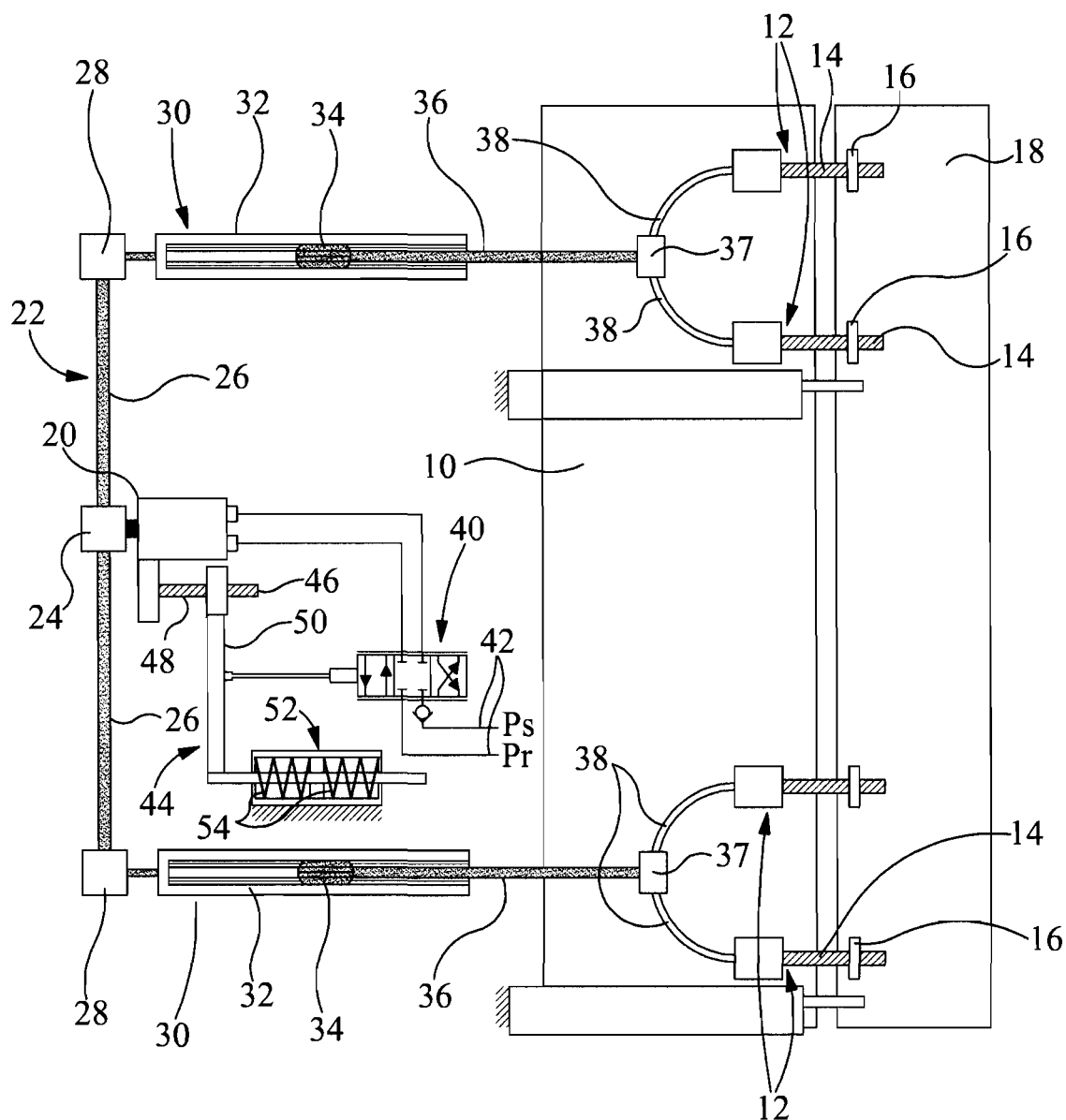

This invention relates to an actuator arrangement, and in particular to an arrangement suitable for use in controlling the variable air flow fan (VAFN) cowls of an aircraft engine.

It is known to provide an aircraft engine with a series of movable cowls, the positions of which can be adjusted, using appropriate actuators, to vary the nozzle dimensions of the engine to suit the operating conditions of the engine. The nozzle dimension is the size of the exit throat defined between the exit end of the fan cowl and the core engine housing. It has been found to be advantageous for the nozzle dimension to be relatively large during the take-off and climb phases of the engine operation, and to be of reduced dimensions during cruise conditions. During descent, the nozzle dimension is often increased in case it is necessary to abort landing, and so enter another climb phase.

The thrust reverser system of the aircraft engine may also include a series of cowls movable between a stowed position and a deployed, operative position.

Typically, separate actuators are provided to drive the VAFN cowls and the thrust reverser cowls. The actuators may comprise, for example, hydraulic actuators or electrically driven ball-screw type linear actuators. U.S. Pat. No. 5,806,302 describes a system in which the actuators used to drive the VAFN cowls are anchored to the actuators used to operate the thrust reverser system so that, upon extension of the thrust reverser actuators to deploy the thrust reverser system, the VAFN cowls are automatically moved to increase the nozzle dimension. Controlling the operation of the VAFN actuator in such an arrangement is difficult, as the control arrangement has to be able to accommodate movement of the thrust reverser cowls. U.S. Pat. No. 5,778,659 describes an arrangement in which separate actuators for the two sets of cowls are provided, both actuators being grounded to the airframe structure. Such an arrangement results in the VAFN actuator having to be of very large stroke which has significant cost, power and weight implications.

U.S. Pat. No. 5,655,360 uses a single actuator to control both the nozzle dimensions and the thrust reverser. A first part of the actuator's stroke adjusts the nozzle dimension, further movement driving the thrust reverser to its deployed position. As this arrangement would require at least some of the thrust reverser actuator locks to be released when the thrust reverser is not to be deployed, this arrangement may be unsuitable for use in some applications.

It is an object of the invention to provide an actuator arrangement for use in such applications of simple and convenient form.

According to the present invention there is provided an actuator arrangement comprising an actuator having a rotatable drive input, a motor, and a drive transmission arrangement for transmitting rotary drive from the motor to the rotatable drive input of the actuator, wherein the transmission arrangement includes a telescopic drive coupling.

Such an arrangement may be used to drive, for example, a VAFN cowl in an arrangement in which the actuator of the VAFN cowl is itself movable, for example being mounted upon a thrust reverser cowl. The telescopic drive coupling, in such an arrangement, accommodates movement of the thrust reverser cowl.

The telescopic drive coupling may comprise a tubular member within which is splined a slidable member.

The telescopic drive coupling may be permanently engaged or, alternatively, may disengage after extension thereof beyond a predetermined position.

The motor may be arranged to drive a plurality of actuators. The output of the telescopic drive coupling may drive a plurality of actuators, and the motor may drive a plurality of telescopic drive arrangements.

Conveniently, a failsafe mechanism is provided to drive the actuator to a predetermined position in the event of, for example, a control failure.

The failsafe mechanism may include a backup motor and a control arrangement operable, together, to drive the actuator to the predetermined position.

Alternatively, the failsafe mechanism may include a control valve operable to control the operation of a motor, the control valve being movable by a demand actuator, the demand actuator being spring biased towards a predetermined, failsafe position.

Figure 2:
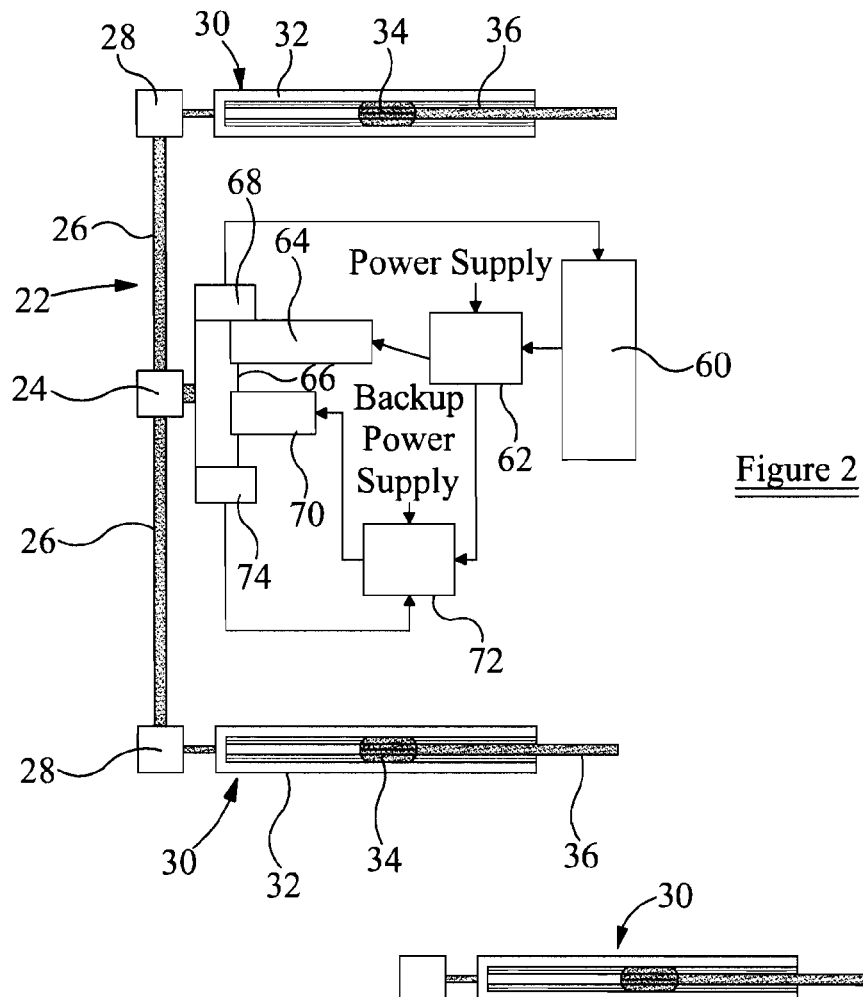
Figure 3:
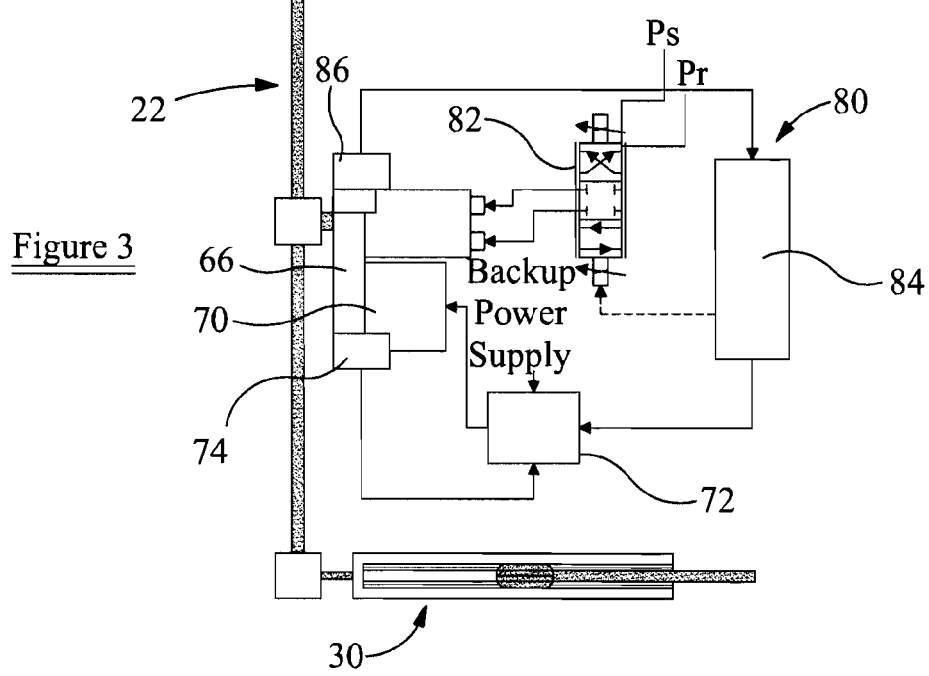

The invention will further be described, by way of example, with reference to the accompanying drawings, in which:

FIG. 1 is a diagram illustrating an actuator arrangement in accordance with one embodiment of the invention; and FIGS. 2 and 3 illustrate alternative drive and control arrangements for the actuator arrangement.

Referring firstly to FIG. 1 there is illustrated, diagrammatically, a movable cowl 10, for example of a thrust reverser system. The cowl 10 is movable by actuators (not shown) under the control of a control system.

Mounted upon the cowl 10 are a series of linear actuators 12, each comprising a rotatable screw shaft 14 upon which is mounted a nut component 16. The nut components 16 are mounted upon a cowl 18 of a VAFN arrangement. It will be appreciated that, in such an arrangement rotation of the screw shafts 14 causes translation of the nut components 16 along the screw shafts 14, thereby causing extension or retraction of the cowl 18 relative to the cowl 10.

The screw shafts 14 are driven for rotation by a motor 20, a transmission arrangement 22 transmitting the output of the motor 20 to the screw shafts 14. The transmission arrangement 22 includes a first gearbox 24 located close to the motor 20 and arranged to drive transmission shafts 26. Each shaft 26 is connected, via a second gearbox 28, to a telescopic drive coupling 30. The telescopic drive coupling 30 comprises a hollow drive shaft 32 within which an output member 34 is splined, an output shaft 36 being coupled to the output member 34. The output shaft 36 is coupled, via a further gear box 37 and flexible drive shafts 38, to the inputs of the actuators 12.

The provision of the telescopic drive couplings 30 ensures that drive can be transmitted to the linear actuators 12 irrespective of whether the cowl 10 occupies a stowed position or a deployed position, movement of the cowl 10 between these positions simply resulting in the output member 34 of each coupling 30 sliding within the respective hollow drive shaft 32 whilst remaining splined thereto so that rotary drive can still be transmitted through the telescopic drive coupling 30.

In this embodiment, the motor 20 is an hydraulic motor, a proportional control valve 40 controlling the connections of the motor 20 to supply and return pressure lines 42 to control the direction of operation of the motor 20, and hence the direction of movement of the cowl 18. A feedback arrangement 44 is provided to control the operation of the valve 40.

The feedback arrangement comprises a screw shaft 46 driven by the motor 20, a nut 48 being mounted upon the screw shaft 46 and held against rotation such that operation of the motor 20 causes the nut 48 to translate along the screw shaft 46. A linkage 50 is connected between the nut 38 and a demand actuator 52, and a spool of the control valve 40 is connected to a mid-point of the linkage 50.

In use, if it is desired to move the cowl 18 to a more extended position, the demand actuator 52 is moved, say, to the right. This causes the spool of the control valve 40 to move, resulting in operation of the motor 20. As the motor operates, the screw shaft 46 rotates causing displacement of the nut 48, to the left and movement of the linkage 50. When a point is reached at which the linkage 50 occupies a position in which the control valve 40 switches back to the position illustrated, motor operation ceases.

It is desirable, in the event of a control failure, to move the VAFN cowl 18 to a failsafe position in which, although the operation is not optimised, the nozzle dimension is acceptable for all engine operation conditions. The demand actuator 52 conveniently includes springs 54 biasing it towards a demand position which corresponds to a condition in which the cowl 18 occupies the failsafe position.

The arrangement described hereinbefore provides a relatively simple way of providing control to the actuators 12 and also provides a failsafe mode of the VAFN cowl. As operation is independent of operation of, for example, the thrust reverser cowl 10, no changes to the nature or operation thereof are needed.

FIG. 2 illustrates an arrangement similar to FIG. 1 but in which the control arrangement is electrically operated. The engines full authority digital engine controller (FADEC) 60 controls the operation of a power controller 62 which, in turn, controls the operation of a primary electric drive motor 64. The output of the motor 64 drives the first gearbox 24 through a differential 66. Rotary variable differential transformers (RVDTs) 68 monitor the differential 66 to provide a feedback signal to the FADEC 60.

To provide a failsafe operating mode, a backup motor 70 and associated controller 72 are provided which are driven from a back-up power supply from the permanent magnet alternator of the main generator. In the event that the controller 72 receives a signal from the controller 62 indicative of a loss of normal control, the motor 72 is operated to drive the cowl 18 to its failsafe position. A proximity switch 74 provides a feedback signal to the controller 72 to indicate when this position has been reached.

FIG. 3 illustrates an arrangement in which the main drive is provided through an hydraulic drive arrangement 80, the proportional control valve 82 of which is controlled by the FADEC 84 using feedback signals from RVDTs 86, and in which a failsafe mode is provided in a manner similar to that of FIG. 2 but in which the sensing of a control loss is via a signal received from the FADEC 84.

In any of the arrangements described hereinbefore, the telescopic drive coupling 30 may be arranged to disengage upon deployment of the cowl 10, re-engaging upon retraction thereof.

Rather than use a splined coupling, the telescopic drive arrangement may include a non-contacting, for example magnetic, drive transmission.

If desired, lock arrangements may be provided to secure the cowl 18 against movement. The lock arrangements may be provided in, for example, the actuators 12 or in the transmission arrangement 22.

To assist in control, if desired LVDTs or other position sensors may be arranged to monitor the cowl positions.

A number of other modifications and alterations may be made to the arrangements described herein without departing from the scope of the invention.

The invention claimed is:

1. A thrust reverser and VAFN arrangement comprising a movable thrust reverser cowl moveable between stowed and deployed positions by a thrust reverser actuator, a VAFN cowl mounted for movement relative to the thrust reverser cowl, and a VAFN actuator arrangement comprising a VAFN actuator and a VAFN gearbox independent of the thrust reverser actuator wherein the VAFN actuator and the VAFN gearbox are mounted upon the thrust reverser cowl, the VAFN actuator having a rotatable drive input and an output, the output being connected to the VAFN cowl such that operation of the VAFN actuator drives the VAFN cowl for movement relative to the thrust reverser cowl, a motor and a drive transmission arrangement for transmitting rotary drive from the motor to the rotatable drive input of the VAFN actuator, the transmission arrangement including a telescopic drive coupling, and wherein an output shaft of the telescopic drive coupling coupled with the VAFN gearbox telescopes to accommodate movement of the thrust reverser cowl between its stowed and deployed positions.

2. An arrangement according to claim 1, wherein the telescopic drive coupling comprise a tubular member within which is splined a slidable member.

3. An arrangement according to claim 1, wherein the telescopic drive coupling is permanently engaged.

4. An arrangement according to claim 1, wherein the telescopic drive coupling is arranged to disengage after extension thereof beyond a predetermined position.

5. An arrangement according to claim 1, wherein the motor is arranged to drive a VAFN plurality of actuators.

6. An arrangement according to claim 1, wherein the output of the telescopic drive coupling drives a plurality of VAFN actuators.

7. An arrangement according to claim 1, wherein the motor drives a plurality of telescopic drive arrangements.

8. An arrangement according to claim 1, wherein a failsafe mechanism is provided to drive the VAFN actuator to a predetermined position in the event of a control failure.

9. An arrangement according to claim 8, wherein the failsafe mechanism includes a back-up motor and a control arrangement operable, together, to drive the VAFN actuator to the predetermined position.

* * * * *